W. A. MORGAN.
STOCK BREEDING DEVICE.
APPLICATION FILED SEPT. 29, 1919.

1,334,256.

Patented Mar. 16, 1920.
2 SHEETS—SHEET 1.

Witness:
Adelaide Kearns

Inventor:
W. A. Morgan;
By Robert W. Caudle
Attorney.

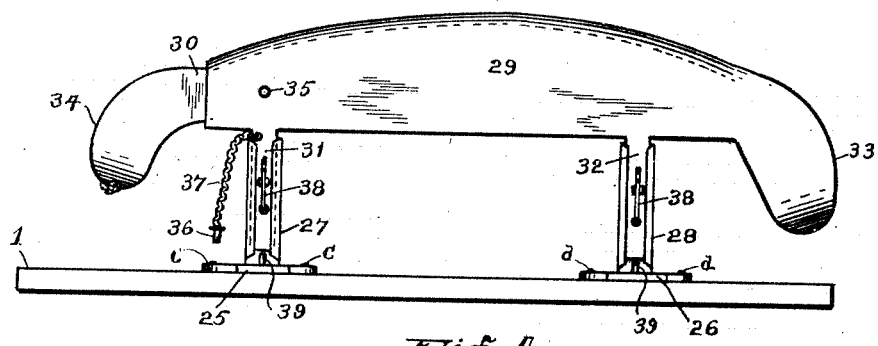
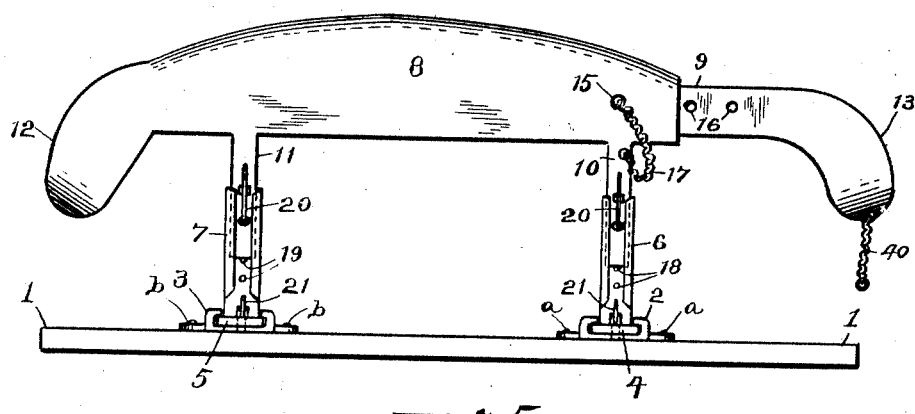

UNITED STATES PATENT OFFICE.

WILLIAM A. MORGAN, OF INDIANAPOLIS, INDIANA.

STOCK-BREEDING DEVICE.

1,334,256.  Specification of Letters Patent.  Patented Mar. 16, 1920.

Application filed September 29, 1919. Serial No. 327,239.

*To all whom it may concern:*

Be it known that I, WILLIAM A. MORGAN, a citizen of the United States, residing in the city of Indianapolis, in the county of Marion, State of Indiana, have invented a new and useful Stock-Breeding Device, of which the following is a full, clear, and comprehensive specification and exposition, the same being such as will enable others to make and use the same with exactitude.

The object of this invention, broadly speaking, is to provide a stock breeding device which will be strong and durable in construction, easily operated and controlled, adapted to be adjusted to animals of various sizes, and which can be manufactured and sold at a comparatively low price.

More specifically stated, my object is to provide a device for supporting a female animal when being bred to a male, whereby the limbs of the female will not break down, thereby enabling one to breed a comparatively small female to a large male without injury to the former.

As my device is especially intended for hogs I will hereinafter refer to the female animal as the "sow" and the male animal as the "boar," but of course my device is not limited to swine.

Other objects and particular advantages of the invention will suggest themselves in the course of the following description, and that which is new will be correlated in the appended claims.

Figure 1:
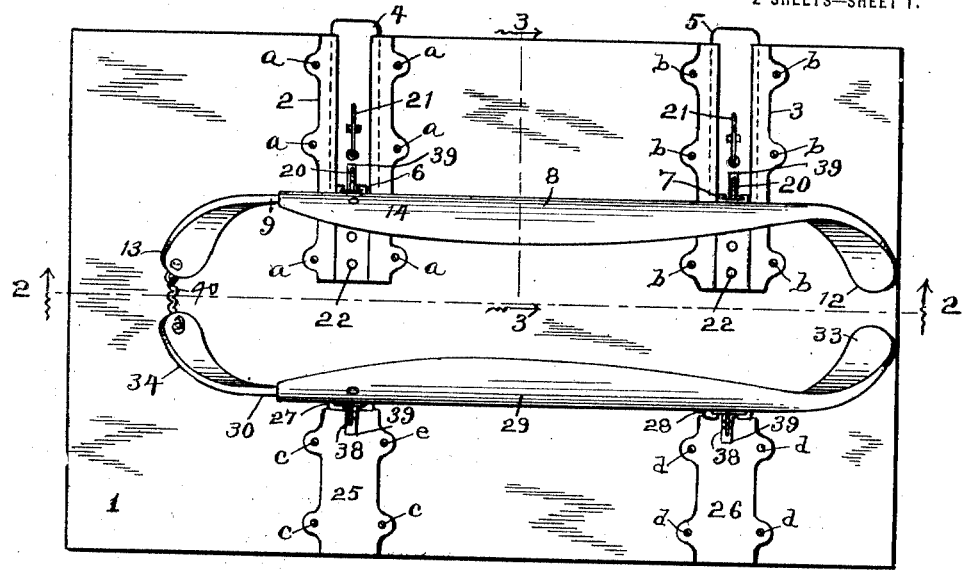
Figure 2:
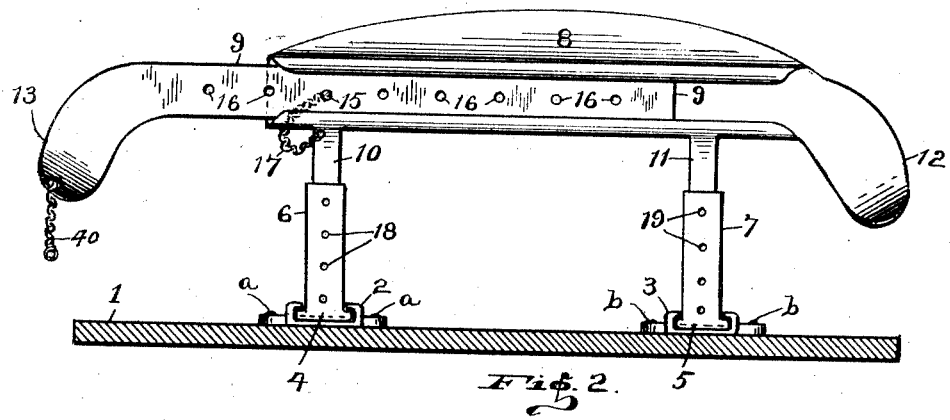
Figure 3:
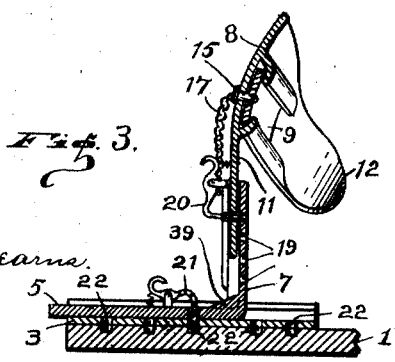

The preferred means for carrying out the principles of my invention in a practical manner is shown in the accompanying two sheets of drawings, in which—Figure 1 is a top plan view of my complete construction. Fig. 2 is a longitudinal central section showing the inner face of one side in elevation, as taken on the line 2—2 of Fig. 1. Fig. 3 is a cross section of one side of the device, as taken on the line 3—3 of Fig. 1. Fig. 4 is an elevation of one side of the device. And Fig. 5 is an elevation of the other side of the device.

Similar indices denote like parts throughout the several views.

In order that the construction, the operation, and the advantages of my invention may be more fully understood and appreciated, I will now take up a detailed description thereof, in which I will set forth the invention as comprehensively as I may.

Referring now to the drawings in detail: Numeral 1 denotes the base, forming a platform, upon which all of the other parts of the device are mounted, as hereinafter set forth.

The mechanism comprises a pair of coöperating and oppositely disposed side devices which are not connected with each other, but are spaced apart, the one on the right being formed adjustable as to length and height and also adjustable laterally; while the device on the left is adjustable only as to length and height.

Except as to said lateral adjustment the two side devices are identical with each other, but they are oppositely disposed with relation to each other.

The device on the right comprises the two spaced apart bifurcated brackets 2 and 3, each having a plurality of ears on each side edge to receive the respective screws *a* and *b* by which they are securely attached to the surface of the base 1.

Slidable in the bifurcated channels of the brackets 2 and 3 are the respective plates 4 and 5. Extending up from the inner ends of the plates 4 and 5, at right angles thereto, are the respective standards 6 and 7, which are also bifurcated, that is each has a channel in its outer face.

Numeral 8 denotes the body member of the right-hand device, which has a straight lower edge, and an upwardly curved upper edge, and on the inner face thereof a bifurcated channel is formed throughout its length in which is slidably mounted the extension bar 9. Formed integral with and extending down from the member 8 are the two arms 10 and 11 which are adapted to slide up and down in the channels of the respective standards 6 and 7.

Extending rearward, downward, and inward in a curve from the rear end of the member 8 is the hand 12. Likewise extending forward, downward, and inward from the forward end of the bar 9 is the hand 13. The members 8, 12, 9 and 13 are formed concavo-convex in cross section, with the concave sides of all facing inward.

Above the lower edge, and near the forward end of the member 8 an aperture 14 is formed for the key 15, there being a plurality of apertures 16 formed throughout the length of the bar 9 which register with the aperture 14, whereby the key 15 may be inserted into the aperture 14 and into one of the apertures 16 in order to lock the bar 9 from longitudinal movement after being adjusted.

A chain 17 is attached to the key 15 and to the arm 10 to prevent said key from being lost when not in use.

A plurality of apertures 18 and 19 are formed in the center of the standards 6 and 7, respectively, and a single aperture is formed through each of the arms 10 and 11 to register with the respective apertures 18 and 19. A spring clip 20 is mounted on the outer face of each of the arms 10 and 11, each having a plunger which is normally pressed into the respective apertures in said arms and into one of the corresponding apertures 18—19 of the standards 6 and 7, in order to lock the member 8 at the desired height. Also a similar spring clip 21 is mounted on the plates 4 and 5, with their plungers normally pressed through an aperture in the respective plates 4 and 5, and adapted to enter one of the apertures 22 formed through the brackets 2 and 3, whereby the member 8 may be locked from lateral displacement.

The device on the left comprises the two spaced apart bifurcated brackets 25 and 26, each having a plurality of ears on each side edge to receive the respective screws c and d, by which they are securely attached to the surface of the base 1, in alinement and parallel with the brackets 2 and 3.

Extending up from the inner ends of the brackets 25 and 26, at right angles thereto, are the respective standards 27 and 28, which are bifurcated, that is each has a channel in its outer face.

Numeral 29 denotes the body member of the left-hand device, which has a straight lower edge, and an upwardly curved upper edge, corresponding in size and shape with the member 8 with which it is oppositely disposed. On the inner face of the member 29 a bifurcated channel is formed throughout the length thereof in which is slidably mounted the extension bar 30, corresponding with the bar 9.

Formed integral with and extending down from the member 29 are the two arms 31 and 32, which are adapted to slide up and down in the channels of the respective standards 27 and 28.

Extending rearward, downward, and inward from the rear end of the member 29 is the hand 33. Likewise extending forward, downward, and inward from the forward end of the bar 30 is the hand 34.

Above the lower edge, and near the forward end of the member 29 an aperture 35 is formed for the key 36, there being a plurality of apertures (like the apertures 16) formed throughout the length of the bar 30 which register with the aperture 35, whereby the key 36 may be inserted into the aperture 35 and into one of said apertures in the bar 30, in order to lock the bar 30 from longitudinal movement. A chain 37 attached to the key 36 and to the arm 31 prevents said key 36 from being lost when it is out of commission.

A plurality of apertures are formed along in the center of each of the standards 27 and 28, like the apertures 18 and 19, and a single aperture is formed through each of the arms 31 and 32 to register with the apertures in said standards. A spring clip 38 is mounted on the outer face of each of the arms 31 and 32, each having a plunger which is normally pressed into the respective apertures in said arms, and into one of the corresponding apertures in the standards 27 and 28, in order to lock the member 29 at the desired height. Said clips 38 are identical with the clips 20 and 21. The standards 6, 7, 27 and 28 are made rigid each by means of a triangular brace 39, as shown in Fig. 3, one of which connects each of said standards 6 and 7 with its respective plate 4 and 5; and each of said standards 27 and 28 is likewise connected with one of the respective brackets 25 and 26.

The forward ends of the members 13 and 34 are adapted to be detachably connected by the chain 40.

In practice the members 8 and 29 are first spaced apart, and then a sow may be driven therebetween, standing upon the base 1. The member 8 is then pressed inward with the members 8 and 29 firmly pressed against the sides of the sow, and with the hands 12 and 33 fitting snugly against the rear of the sows hams. The clips 21 are then allowed to engage to prevent the members 8 and 29 from being forced apart. The bars 9 and 30 are then pressed back until the hands 13 and 34 engage snugly against the front of the animal's shoulders immediately above her front legs. The sow will now be held and supported in position. The boar may now have intercourse with the sow while she is confined in the device as stated, after which the clips 21 may be disengaged and the member 8 may then be moved to the right and the sow will then be released.

From the above it is apparent that the sow will be held in such position that she can not be broken down by the weight of the boar no matter how large he is, as the hands 12, 33, 13 and 34 will practically hold her in suspension even if her feet be lifted from the platform 1.

I desire that it be understood that various changes may be made in the several details of construction without departing from the spirit of my invention and without sacrificing any of the advantages thereof which are new and useful.

Having now fully shown and described my invention, what I claim and desire to secure by Letters Patent of the United States, is—

1. A stock breeding device comprising a base, side members spaced apart and supported above the base and adapted to engage the sides of an animal located therebetween, means for adjusting the distance between the side members, hands projecting from the rear ends of the side members to engage the hams of an animal, bars adapted to be extended from the forward ends of the side members, and a hand carried by the forward end of each bar to engage the shoulders of an animal located between the side members.

2. A stock breeding device including a pair of oppositely disposed and spaced apart body members adapted to engage the sides of an animal and conforming to the shape thereof, means for adjusting the height of said members, means for adjusting one of said members laterally, means for securing said members in adjusted position, means carried by the rear ends of said members for supporting the rear portion of an animal, adjustable supporting means carried by the forward portions of the body members for supporting the forward portion of an animal, and means for securing the forward portion of the supporting means in the positions to which they may be adjusted.

3. A stock breeding device comprising a base, a body member for engaging one side of an animal, means for adjusting the height of said body member, a second body member spaced from the first body member and oppositely disposed with relation thereto, means for adjusting the height of the second body member, means for adjusting the distance of the second body member from the first body member, a hand carried by the rear end of each body member, an extension bar projecting from the forward portion of each body member, a hand carried by the forward end of each extension bar, and means for locking the several adjustments of the device, all substantially as set forth.

4. A construction of the nature set forth including a base, brackets secured to the base, standards extending up from the brackets on one side of the device, adjustable standards carried by the brackets on the other side of the device, a pair of spaced body members, arms extending down from said body members and slidably mounted in said standards, hands curved rearward, downward, and inward from the rear ends of the body members, extension bars slidably mounted to the body members and adapted to be extended forward thereof, hands curved forward, downward, and inward from the forward ends of the extension bars, and means for securing the several parts in adjusted position, substantially as set forth.

In testimony whereof I have hereunto subscribed my name to this specification in the presence of two subscribing witnesses.

WILLIAM A. MORGAN.

Witnesses:
 ROBT. W. RANDLE,
 R. E. RANDLE.